(12) United States Patent
Kovach et al.

(10) Patent No.: US 10,857,947 B2
(45) Date of Patent: Dec. 8, 2020

(54) VEHICLE UNDER-SEAT CONTAINER

(71) Applicant: L.O.F., Inc., Elkhart, IN (US)

(72) Inventors: Laszlo Antal Kovach, Elkhart, IN (US); Shawn Christopher Scott, Elkhart, IN (US)

(73) Assignee: L.O.F., Inc., Elkhart, IN (US)

( * ) Notice: Subject to any disclaimer, the term of this patent is extended or adjusted under 35 U.S.C. 154(b) by 0 days.

(21) Appl. No.: 16/200,041

(22) Filed: Nov. 26, 2018

(65) Prior Publication Data

US 2020/0164810 A1 May 28, 2020

(51) Int. Cl.
*B60R 7/04* (2006.01)
*E05B 67/00* (2006.01)

(52) U.S. Cl.
CPC ............ *B60R 7/043* (2013.01); *E05B 67/003* (2013.01)

(58) Field of Classification Search
CPC .............................. B60R 7/043; E05B 67/003
USPC ......................................................... 224/275
See application file for complete search history.

(56) References Cited

U.S. PATENT DOCUMENTS

| | | | |
|---|---|---|---|
| 2,931,550 A | 4/1960 | Wood | |
| 3,026,141 A | 3/1962 | Welles | |
| 3,113,801 A * | 12/1963 | Caley | B60N 2/36 |
| | | | 296/66 |
| 3,131,813 A * | 5/1964 | Jensen | B60N 3/08 |
| | | | 224/275 |
| D272,288 S | 1/1984 | Pfaff | |
| 5,227,519 A * | 7/1993 | Lin | C07C 51/12 |
| | | | 562/519 |
| 5,249,724 A * | 10/1993 | Green | B60R 7/043 |
| | | | 220/771 |
| D347,419 S | 5/1994 | Jackson | |
| 5,595,073 A * | 1/1997 | Sullivan | E05B 17/002 |
| | | | 70/159 |
| 5,902,009 A * | 5/1999 | Singh | B60N 2/90 |
| | | | 297/188.1 |
| 5,979,725 A | 11/1999 | Lehrman | |
| D424,805 S | 5/2000 | Green | |
| 6,074,000 A * | 6/2000 | Wagner | A47C 7/62 |
| | | | 297/188.08 |
| D428,701 S | 8/2000 | Lamo, Jr. | |
| 6,106,044 A * | 8/2000 | Schlachter | B60R 7/043 |
| | | | 296/37.15 |
| D431,362 S | 10/2000 | Conti | |
| D450,291 S | 10/2001 | Wang | |

(Continued)

*Primary Examiner* — Nathan J Newhouse
*Assistant Examiner* — Lester L Vanterpool
(74) *Attorney, Agent, or Firm* — Husch Blackwell LLP (57) ABSTRACT

An underseat container system can be positioned between a seat and a floor of a vehicle, and can include an open-topped receptacle or container. The receptacle can be secured to the vehicle seat via a cable lock system, the cable lock system including a cable and a cable lock mechanism. When the receptacle is placed under the vehicle seat, the cable can be threaded through an aperture in a wall of the receptacle, and around a support member in the seat. The cable lock mechanism can secure the threaded cable to itself, thus securing the receptacle to the vehicle seat. When the vehicle seat is configured to accept passengers for seating, the vehicle seat and the receptacle can form a storage compartment.
The receptacle can include a plurality of nubs on its bottom surface, for providing traction to the underseat container when positioned underneath the vehicle seat.

5 Claims, 11 Drawing Sheets

(56) References Cited

U.S. PATENT DOCUMENTS

| | | | |
|---|---|---|---|
| 6,386,612 B2* | 5/2002 | Hofmann | B60R 7/043 |
| | | | 224/275 |
| 6,644,523 B1* | 11/2003 | Salas | B60R 7/043 |
| | | | 224/275 |
| D484,697 S | 1/2004 | McCoy et al. | |
| D487,845 S | 3/2004 | Johansson et al. | |
| 6,824,029 B2* | 11/2004 | Tuel, Jr. | F41C 33/06 |
| | | | 220/532 |
| D506,870 S | 7/2005 | Uihlein et al. | |
| D612,153 S | 3/2010 | Uao | |
| 7,976,101 B2 | 7/2011 | Wieland | |
| D682,552 S | 5/2013 | Ambrefe, Jr. | |
| 8,528,371 B2* | 9/2013 | Spiegel | E05B 37/025 |
| | | | 70/18 |
| 8,622,266 B2 | 1/2014 | McMillan | |
| 9,016,749 B2* | 4/2015 | Mueller | B60R 7/04 |
| | | | 296/37.15 |
| 9,222,285 B1* | 12/2015 | Ilislamloo | E05B 73/0017 |
| 9,365,143 B2 | 6/2016 | Sachs et al. | |
| 9,625,234 B2 | 4/2017 | Booth | |
| 9,688,208 B2 | 6/2017 | Peregrina Loera et al. | |
| 9,873,383 B1 | 1/2018 | Mather et al. | |
| D824,323 S | 7/2018 | Amos et al. | |
| 10,046,709 B2 | 8/2018 | Loera et al. | |
| 10,065,564 B2 | 9/2018 | Romero Contreras et al. | |
| 10,239,589 B2* | 3/2019 | Murphy | B63B 29/04 |
| 2007/0080565 A1* | 4/2007 | Mankovitz | A47C 7/62 |
| | | | 297/188.01 |
| 2011/0193365 A1 | 8/2011 | Zernec | |
| 2017/0072863 A1* | 3/2017 | Rowland | B60R 7/043 |
| 2018/0222395 A1 | 8/2018 | Roy et al. | |
| 2018/0252018 A1* | 9/2018 | Gibson | E05G 1/005 |

\* cited by examiner

VEHICLE UNDER-SEAT CONTAINER

FIELD OF THE INVENTION

The present invention relates to a container system that can be adjustably secured under the seat or cab of a vehicle. The invention particularly relates to container systems that can be secured with an adjustable cable lock mechanism or protruding nubs on the bottom of the container.

BACKGROUND

Many automotive vehicles include vehicle seats below which storage containers can be placed. Such containers can be secured to a support structure of the vehicle seat. Normal operation of the vehicle can cause such containers to shift on the floor of the vehicle. When the vehicle is parked, open or exposed containers can invite theft of the articles in the container, or can allow the articles to spill out of the storage container.

There is a need for such underseat containers to be configured to tuck neatly under vehicle seats, to stow articles safely away from passengers in the vehicle, and to be secured such that the containers remain away from view, to decrease the risk of theft. There is a need for storage containers that can be secured to the vehicle seat easily and quickly, preferably installed without additional tools or with a minimum of tools. There is also a need for such containers configured to have their positions readily adjusted and to facilitate their removal from the vehicles.

BRIEF SUMMARY OF THE INVENTION

The present disclosure relates to an underseat storage system for a vehicle having i) a seating system extending substantially an entire length of the vehicle and ii) a floor surface, the seating system having support members at opposing ends, the underseat storage system comprising: a storage receptacle comprising a bottom wall, upstanding side walls, a front wall, and a rear wall, wherein the rear wall includes an aperture in a central portion of the rear wall; and an adjustable lock system comprising: a cable and a cable lock mechanism, the cable lock mechanism for securing first and second segments of the cable to each other; such that when the storage receptacle is positioned underneath the seating system, the cable i) is threaded through the aperture and ii) engages the support member, and the adjustable cable lock mechanism for securely locking the first and second cable segments to each other.

In some embodiments, when the adjustable lock system is engaged, the underseat storage system and the seating system define a storage compartment.

In some embodiments, the storage compartment is inaccessible to a passenger when seating system is in a configuration to seat an individual.

In some embodiments, the storage receptacle includes an open top.

In some embodiments, the bottom wall is contoured to lie flush against the vehicle floor surface.

In some embodiments, the bottom wall comprises a plurality of protruding nubs.

In some embodiments, each cable lock mechanism is for securing the cable at any pair of a plurality of cable segments.

The present disclosure also relates to an underseat storage system for a vehicle, the underseat storage system comprising: a storage receptacle comprising: a bottom, a front and a rear, and a pair of sidewalls, the storage receptacle including a plurality of apertures in at least one of the front, rear, and side walls; a plurality of cables, the cables for passing through the apertures; and a plurality of cable lock mechanisms, the cable lock mechanism for securing first and second segments of the cable; such that when at least one cable is positioned i) through at least one aperture and ii) around a support member of a seating system of the vehicle, at least one cable lock mechanism can secure the first and second cable segments to securely lock the storage receptacle under the vehicle seating system.

In some embodiments, each cable has a predefined length.

In some embodiments, each cable includes a plurality of segment and each cable lock mechanism can attach to any one of the segments.

In some embodiments, each aperture is closer to an upper edge of the rear wall than to the bottom.

In some embodiments, the storage receptacle includes an open top.

In some embodiments, the front, the rear, and the sidewalls are contoured to lie flush along a bottom surface of the seating system, when the seating system is configured to provide seating for an individual.

The present disclosure also relates to an underseat storage system for a vehicle having a seating system, the underseat storage system comprising: an elongated bin having an open top, the bin including one or more apertures on a surface of the bin, wherein the bin forms a storage compartment when the open top is positioned underneath the seating system; such that a bottom surface of the elongated bin comprises a plurality of protruding nubs.

Some embodiments comprising one or more adjustable cable lock mechanisms, each cable lock mechanism comprising a cable and a cable lock mechanism for engaging a segment of the cable; such that when the cable lock mechanism is positioned within the aperture and around a support member of a seating system of the vehicle, the cable lock mechanism can engage the cable to secure the bin to the support member.

In some embodiments, each cable lock mechanism is for securely engaging a central segment of the cable.

In some embodiments, the elongated bin is a unitary piece.

In some embodiments, the elongated bin is made of plastic.

In some embodiments, the open top is contoured to lie flush along a bottom surface of the seating system, when the seating system is configured to provide seating for an individual.

BRIEF DESCRIPTION OF THE DRAWINGS

The invention is best understood from the following detailed description when read in conjunction with the accompanying drawings wherein like reference numerals refer to like parts throughout the different views and embodiments. The various features of the drawings are not necessarily to-scale. The drawings described herein are for illustrative purposes and are not intended to limit the scope of the present disclosure.

DETAILED DESCRIPTION OF THE DRAWINGS

The description of illustrative embodiments according to principles of the present invention is intended to be read with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "front," "rear," "horizontal," "vertical," "above," "below," "top" and "bottom" as well as derivative thereof (e.g., "horizontally," "downwardly," "upwardly," etc.) should be construed to refer to the orientation as then described or as shown in the drawing under discussion.

These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures.

The features and benefits of the invention are illustrated by reference to exemplified embodiments and examples. Accordingly, the invention expressly should not be limited to such exemplified embodiments illustrating some possible but non-limiting combination of features that may be provided alone or in other combinations of features; the scope of the invention being defined by the claims appended hereto. The following description of the preferred embodiment(s) is merely exemplary in nature and is in no way intended to limit the invention, its application, or uses.

The underseat container system 10 is for use in conjunction with the seating system 303 of a car, truck, or other vehicle. Embodiments of the invention can be used with vehicle seating systems 303 that extend substantially for an entire length of the vehicle; that is, they can span most or all of the distance between the single seat, multiple seats, or cab spanning between the sides of a vehicle. Such a vehicle seating system 303 can include seat back 305 attached to a seating surface provided by a vehicle seat 307. Seat support members 309 can attach the vehicle seat 307 to the floor 315 of the vehicle 315. The underseat container system 10 can be placed under a bottom surface 313 of the vehicle seat 307 and secured to the vehicle seat 307, for example at opposite ends 317 of the vehicle seat 307

As shown in FIGS. 1-8, the underseat container system 10 can include a receptacle 20 that can act as a storage container. The receptacle 20 can be arranged to fit in the space under a vehicle seat 307 such as a pair of conventional seats, a bench seat, or cab of a conventional vehicle, such as a truck or car. The underseat container system 10 can have dimensions such that it can be positioned into a close-spaced relation to the vehicle floor 315 subjacent to the vehicle seat 307.

Figure 6:
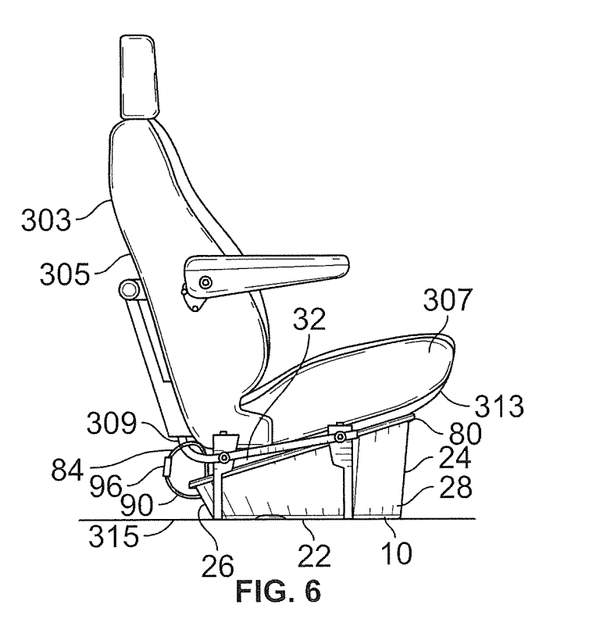
FIG. 6 shows a side view of an underseat container system, secured to a vehicle seating system in the upright or seating position.

The receptacle 20 can be made of one piece of material, such as plastic, or any other material found suitable for the purpose. The receptacle 20 can include a bottom wall 22, as well as an upstanding front wall 24, rear wall 26, and side walls 28 that are connected to the bottom wall 22. The receptacle 20 can serve as a bin or storage container, and can contain a variety of articles. In preferred embodiments, the receptacle 20 can lack a top wall or lid; such receptacle can be lidless or have an open top 30. As shown in FIG. 6, the receptacle 20 can be configured with the vehicle seat 307 such that the vehicle seat 307 itself acts as a top wall or lid for the receptacle 20. Thus, the receptacle 20 and vehicle seat 307 (e.g., the bottom surface 313 of the vehicle seat 307) can be configured together to provide or define a storage compartment 32 for containing and concealing the articles.

Figure 7A:
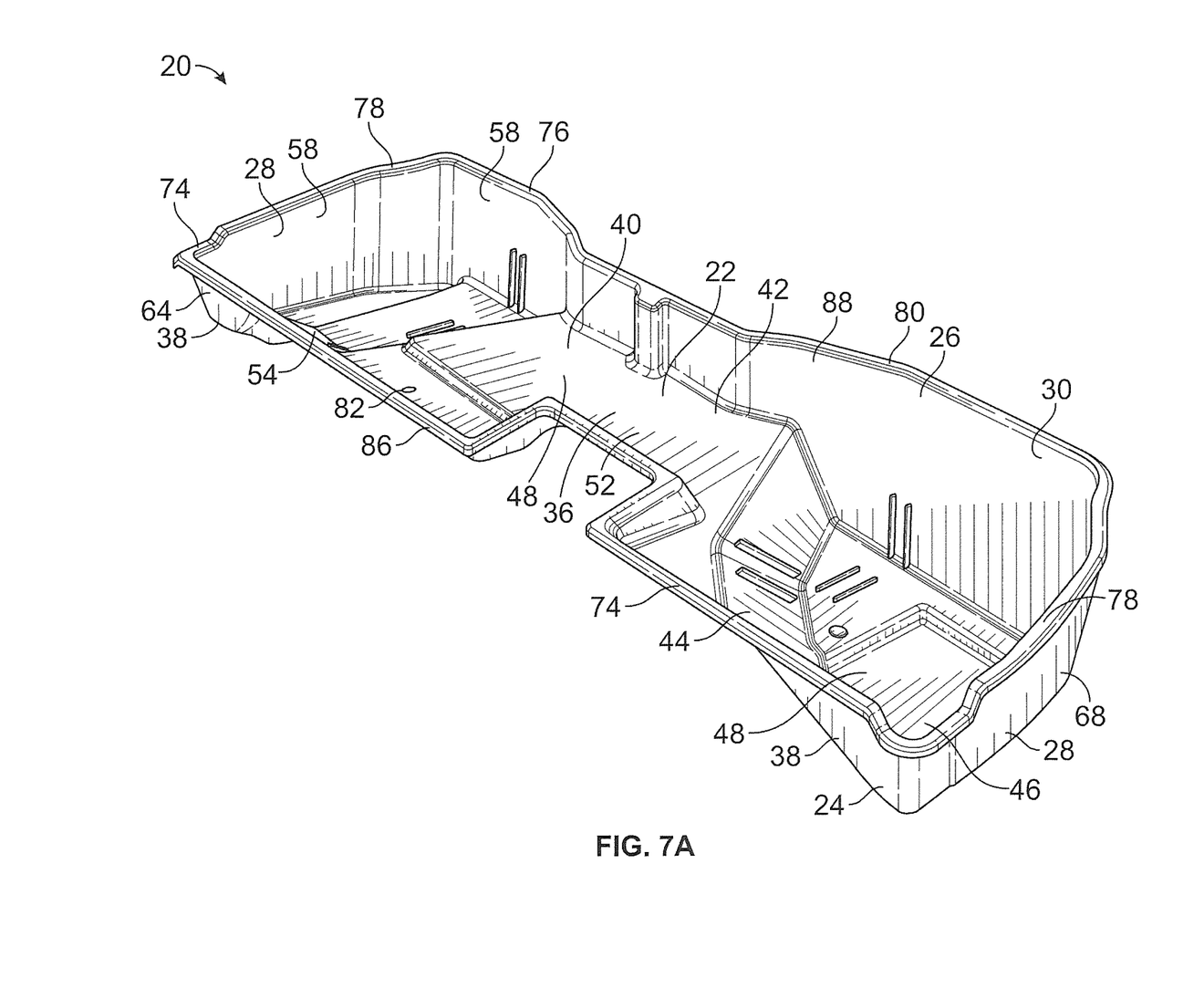
FIGS. 7A-7G show views of an embodiment of the underseat container system, with FIG. 7A showing a perspective view, FIGS. 7B-7G showing front, rear, right, left, top, and bottom views, respectively.
Figure 7B:
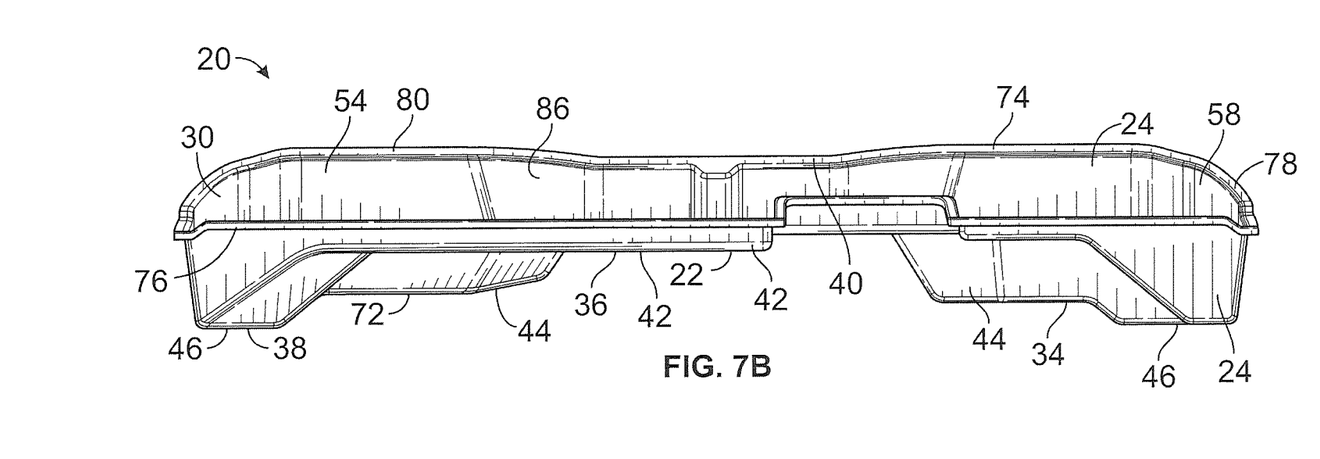
Figure 7C:
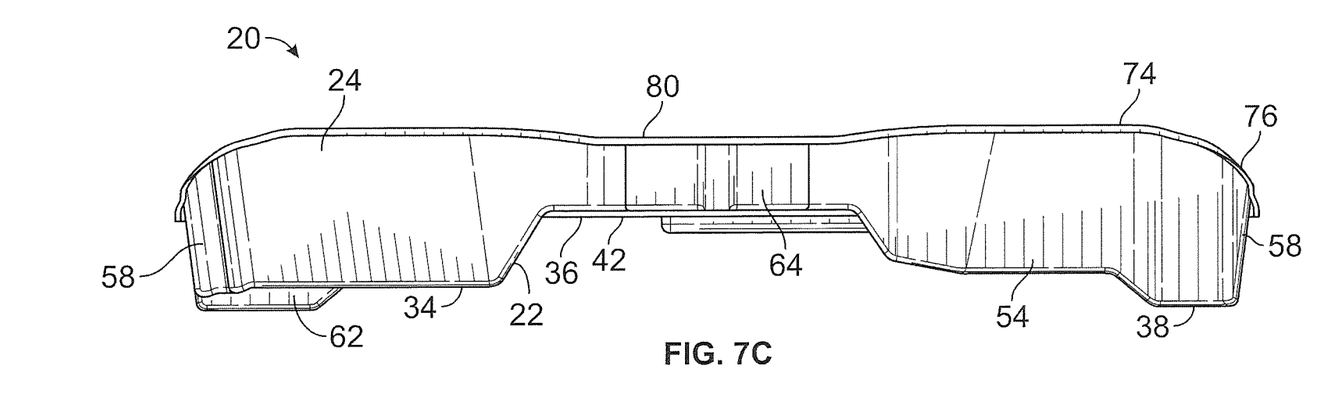
Figure 7D:
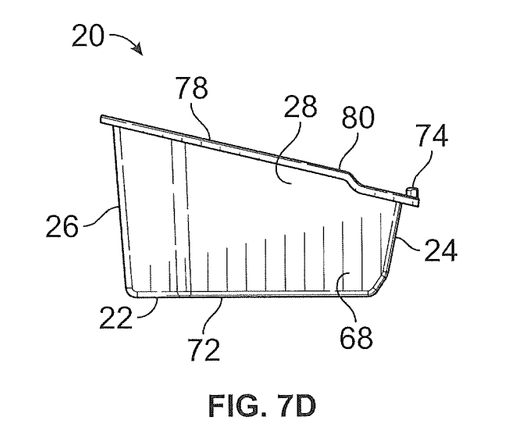
Figure 7E:
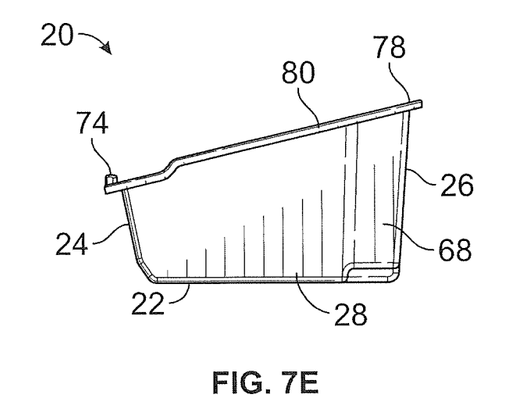
Figure 7F:
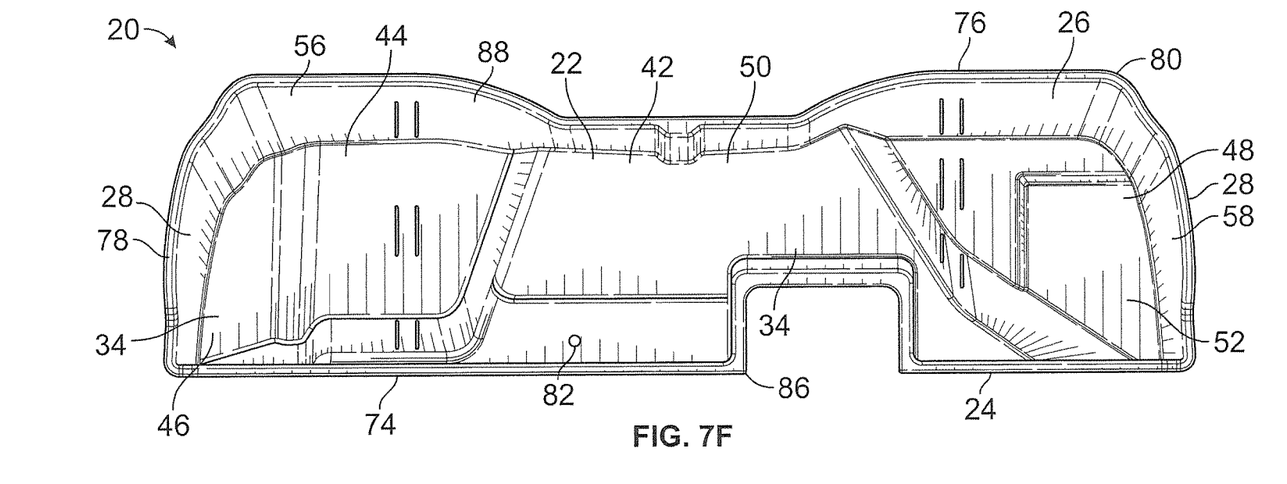

The receptacle 20 can have a shape that is elongated or rectangular, forming an elongated bin or container. In some embodiments, the receptacle 20 can comprise a substantially rectangular receptacle or one that has a C-shape, as shown in FIGS. 7F-7G and 8F-8G. The bottom wall 22 can be flat or can be contoured to communicate with the floor surface 315 of the vehicle. It is preferred that the bottom wall 22 fit snugly against the vehicle floor 315. To accommodate the sometimes-irregular contours and elevation of various vehicle floors 315, the bottom wall 22 can include multiple segments of different heights, lengths, and widths. As shown in FIGS. 8A-8C, a central portion 36 of the bottom wall can be elevated with respect to the end portions 38 flanking the central portion, providing the central portion 36 of the bottom wall 22 with an elevated section or a hump 40. As shown in FIGS. 7A-7C, the bottom wall 22 can include a central segment 42 with a higher elevation than flanking segments proximal 44 to the central segment 42, and the proximal flanking segments 44 can have higher elevations than distal segments 46 flanking the proximal segments 44. Such distal segments 46 can also comprise the end portions 38 of the bottom wall 22. As shown here, the bottom wall 22 can define a tiered or multi-level hump 40. Such a hump 40 can have the effect of providing the receptacle 20 with the general conformation of a saddlebag, with deeper end storage sections 48 flanking a shallower central storage section 50.

The front and rear walls 24, 26 can possess heights that are the same or different. As shown in FIGS. 7B and 8B, the front wall 24 can have a height that is less than the height of the rear wall 26. As shown in FIGS. 7A and 8A, the bottom, front, rear, and side walls 22, 24, 26, 28 can have inner surfaces 52, 54, 56, 58 facing and defining the boundaries of the storage compartment 32. The bottom, front, rear, and side walls 22, 24, 26, 28 can have outer surfaces 62, 64, 66, 68 opposite the inner surfaces 52, 54, 56, 58.

When the underseat container system 10 is secured to the vehicle seat 307, the outer surface 66 of the rear wall 26 can contact or communicate with the vehicle seat 307, while the outer surface 64 of the opposite front wall 24 can communicate with the legs of passengers seated in the vehicle.

As shown such as shown in FIGS. 7A and 8A, the front, rear, and side walls 24, 26, 28 can include upper edges 74, 76, 78 having a rounded or beveled surface or lip 80. The upper edges 74, 76, 78 can be turned outward to define a turned-over lip 80 that can enhance the overall strength and stiffness of the receptacle 20 and can minimize distortion of the front, rear, and side walls 24, 26, 28. In some embodiments, the lip 80 can be contoured to communicate with a bottom surface 313 of the vehicle seat 307, or to lie flush against it.

In some embodiments, the lip 80 can be contoured to be positioned proximate, yet not touching the bottom surface 313 of the vehicle seat 307. Where the bottom surface 313 of the vehicle seat 307 slopes outward and upward, the upper edges 78 of the receptacle side walls 28 can also slope outward and upward to allow the underseat container system 10 to be positioned under the vehicle seat 307 and for the entire upper edge 78 (or a portion of it) remain proximate to the vehicle seat 307.

The receptacle walls (e.g., 24, 26, 28) can include one or more apertures 82. In preferred embodiments, such as shown in FIGS. 7-8, the front or rear walls 24, 26 (or both) can include one or more apertures 82 for accommodating one or more locking systems 84 meant to secure the receptacle 20 to the vehicle seat 307. It is preferred that such apertures 84 be located in a central portion 86, 88 of a front or rear wall 24, 26. It is also preferred that such apertures 82 be located closer to the receptacle lip 80 (or upper edge 74, 76, 78) than to the bottom wall 22. As shown in FIGS. 7B-7C, where both the front and rear walls 24, 26 have one or more apertures 82, those corresponding apertures 82 in the front and rear walls 24, 26 can define a line that is parallel to a central axis of the receptacle 20. Where both the front and rear walls 24, 26 have a plurality of apertures 82, corresponding apertures 82 in the front and rear walls 24, 26 can define lines that are parallel to each other. Where there are multiple apertures 82 in a front or rear wall 24, 26, the apertures 82 can spaced at regular or equal distances apart from each other.

When the receptacle 20 has been placed on the vehicle floor 315, proximate to the vehicle seat 307, the receptacle 20 can be secured to the vehicle seat 307 via one or more adjustable lock systems 84. In order to place the receptacle 20 in such position, it may be necessary to place the vehicle seat 307 into the upright or uplifted position, as shown in FIG. 6.

Figure 3:
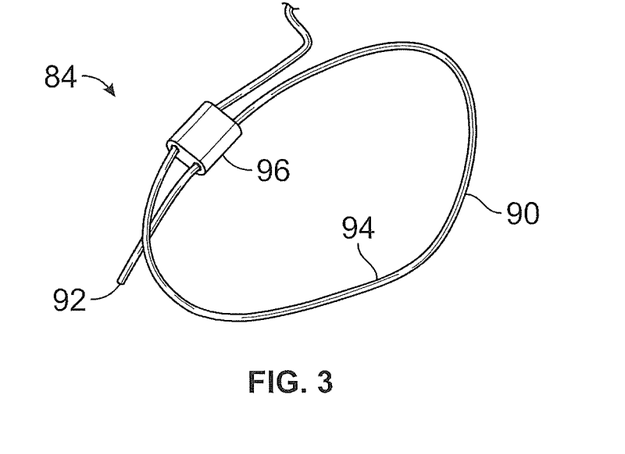
FIG. 3 shows a cable lock system in a secured configuration, so that one segment of the cable is secured to another segment of the cable by the cable lock mechanism.
Figure 4:
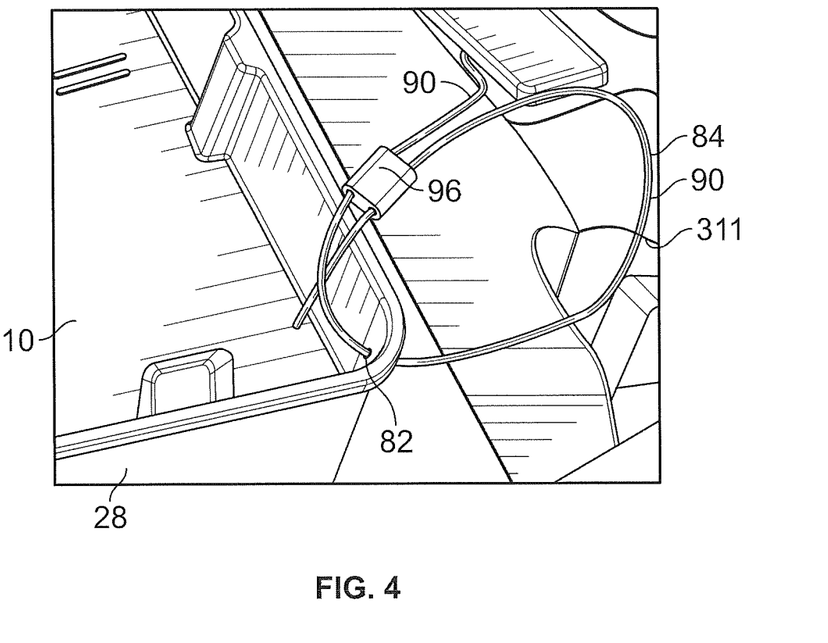
FIG. 4 shows a partial perspective view of an underseat container during installation under a vehicle seat system, the cable lock mechanism has secured the cable to itself, but is loose enough to allow the underseat container a degree of movement.
Figure 5:
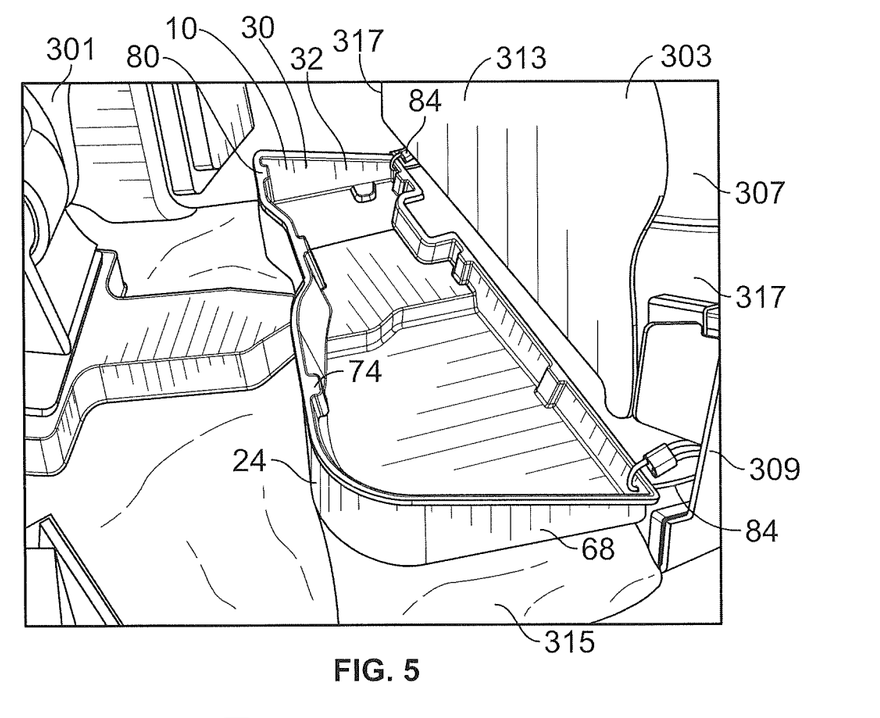
FIG. 5 shows a perspective view of an underseat container configured against a vehicle seat in the upright position, with the underseat container secured to the vehicle seat, with the container secured to the seating system.

The adjustable lock system 84 can be made of a cable 90 and a cable lock mechanism 96, such as shown in FIGS. 2-6. For example, the cable 90 can be threaded through an aperture 82 on the rear wall 26. The cable 90 can also be positioned around a support member 309 of the seat 307 (such as a seat leg), or threaded through an aperture in a support member 309 of the seat 307, preferably in proximity to the vehicle floor 315, such as shown in FIGS. 4-6. Opposing ends 92 of the cable 90 can be drawn together, and the cable lock mechanism 96 can lockingly secure one segment of the cable to a second segment of the cable 90, such as shown in FIG. 3. For example, the cable lock mechanism 96 can connect the opposite ends 92 of the cable 90 to each other; it can connect an end segment 92 of the cable to a central segment 94 of the cable 90; it can connect two central segments 94 or two or more of any of the cable segments (e.g., 92, 94) together. The cable lock mechanism 96 can include a cable seal or other lock mechanism used for securing a cable 90 as is commonly known in the art. It is preferred that such lock mechanism be able to secure the cable 90 to itself at a variety of locations so that the amount of cable 90 used to secure the receptacle 20 can be adjusted to allow for a tight connection or for a looser connection.

Cables 90 can be formed of high strength stainless steel cable which is both relatively thin and flexible and also has a high breaking strength. Cables 90 can be uncoated or coated. Stainless steel cable is especially desirable because it is durable and not easily cut without the aid of specialized tools. Cables 90 can be formed from carbon steel or wire rope. The cables 90 can be supplied in predefined lengths, preferably in lengths sufficient to secure the receptacle to the vehicle seat, but not so long as to tangle with other structures of the underseat container system 10, the vehicle, or the vehicle's passengers.

One or more of the cables 90 can be threaded through the apertures 82 in the container 20, and threaded around a support member 309 in the vehicle, such as the leg of a back seat. The adjustable cable lock system 84 can comprise a plurality of adjustable lock systems 84, each lock system 84 securing the receptacle 20 via a different aperture 82 and vehicle support member 309 (or the same aperture 82 and vehicle support member 309). As shown in FIGS. 4-5, a pair of adjustable locking mechanisms 84 can secure the receptacle 20 to opposite ends 317 of a vehicle seat or bench or cab 307.

A variety of adjustable cable mechanisms 84 can be employed to secure the cable 90, such as ordinarily known in the art. For example, the cables 90 can be threaded into and through a cargo tie, to provide a secured and locked cable 90.

The cable lock mechanisms 96 can tightly lock the cable 90 so that the container 20 is secured to the vehicle structure 309, such as shown in FIG. 5. In preferred embodiments, the cable lock mechanism 96 can be unfastened to provide for the removal of the container from the vehicle, for cleaning or for use in a different vehicle. One advantage of this feature can include the ability to position the container 20 so that it does not protrude past the front edge of the seat 307 or cab, and can remain tucked underneath the seat 307. Thus, this system 10 can shield the container's 20 contents from casual view and decrease the risk of theft of such stored items. But because the length of the cable 90 securing the container 20 can be adjusted, a user can position the container 20 to protrude past the edge of the seat 307, if desired. For example, such configuration can be adopted to allow passengers in the vehicle to have access to the interior portion of the container 20 while the vehicle is occupied or in operation.

More than one configuration can be achieved by locking the cable 90 with the cable locking mechanism 96, as illustrated by FIGS. 3-5. For example, the secured cable 90 can be secured at a first location to provide a loose attachment to enable an individual to move the receptacle 20 while maintaining a secure connection (e.g., to access the interior of the receptacle). The cable 90 can be secured at a second location to provide a tight and secure attachment in which the receptacle 20 can move a small distance or not at all. The cable 90 can be secured at a number of other intermediate positions as desired or needed.

After the receptacle 20 is secured as desired, the seat vehicle 307 can be configured to the folded or seating position (if needed), such as shown in FIG. 6. In this configuration, the bottom surface 313 of the vehicle seat 307 can communicate with the lip 80 of the receptacle 20, thus defining a storage compartment 32 under the vehicle seat 307, such as shown in FIG. 6.

The receptacle 20 can be contoured to fit into the space beneath a vehicle seat 307. In some embodiments, when secured into place and when the vehicle seating system 303 is configured for seating passengers, the rear wall 26 can contact the vehicle seating system 303. In such configuration, the lip 80 can be contoured to contact a bottom surface 313 of the vehicle seat 307, or to be positioned to lie flush along or near the seat bottom surface 313.

Figure 1:
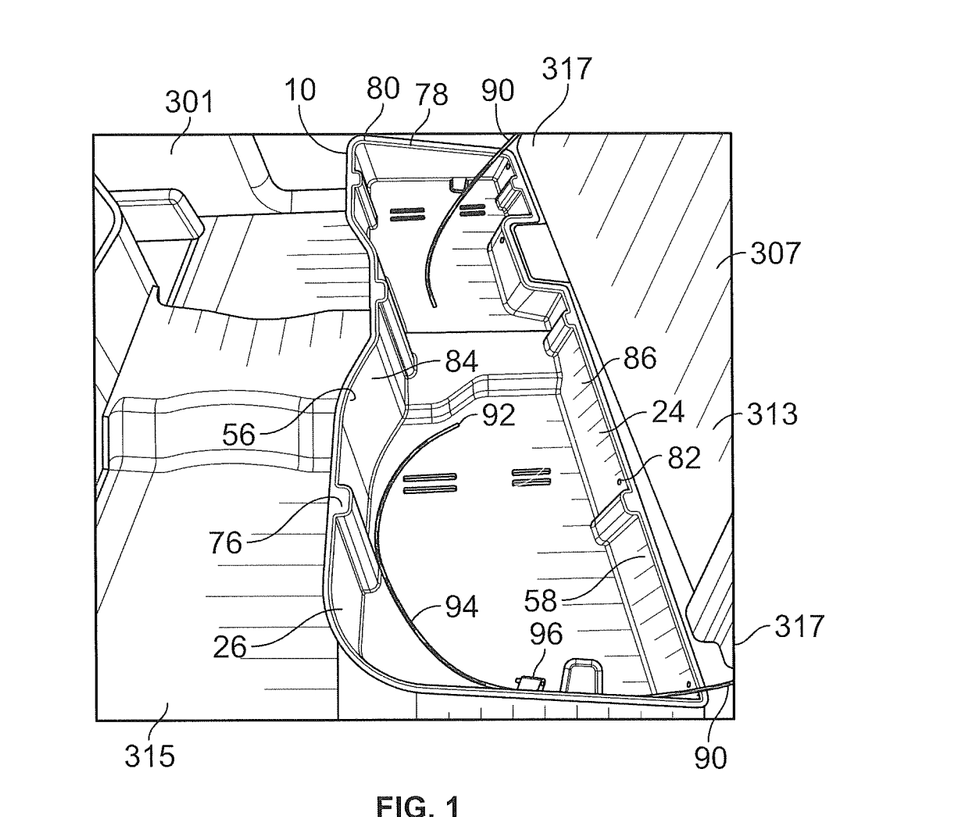
FIG. 1 shows a perspective view of an underseat container system configured against a vehicle seat in the upright position, with the underseat container in an unsecured position.
Figure 2:
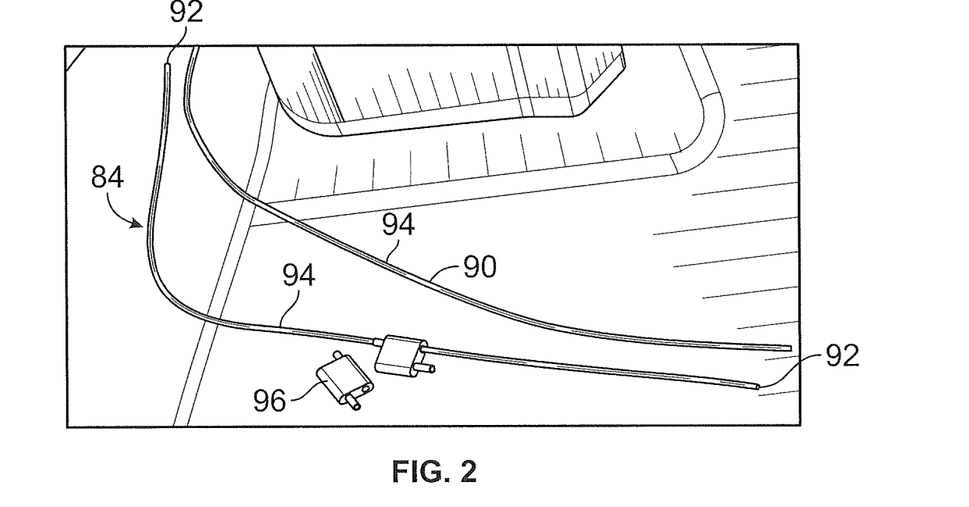
FIG. 2 shows a pair of cable locks systems in unsecured configurations, showing a cable connected to a cable lock mechanism and showing a cable disconnected from a cable lock mechanism.

As shown in FIGS. 1 and 5, the receptacle 20 can extend substantially the entire length of the vehicle seat 307.

The underseat container system 10 can be movably attached to a seat support member 309 extending from a vehicle floor 315 such that the underseat container system 10 and the seat support member 309 cooperate to form a storage compartment 32. The bottom surface 313 of a vehicle seat 307 can be positioned to independently communicate with the open top 30 of the receptacle 20 or the receptacle lip 80. Where the vehicle seat 307 can independently move between a seating state (such as shown in FIG. 6) and a lifted or upright state (such as shown in FIGS. 4-5), the vehicle seat 307 can form the storage compartment 82 in the seating state. Such design provides approximately accessible, contained storage without otherwise compromising the function or the appearance of the vehicle.

A storage container 20 for sundry articles can be designed to fit a variety of vehicle seats and vehicle models. Different embodiments of the invention can include a container or receptacle 20 configured for storing articles that is specifically configured for use with specific vehicles or vehicle models. For example, some receptacles 20 can be specifically designed for delivery from the rear under the rearmost bench seat 307 of a minivan vehicle. Thus it can be seen that the container 20 for storing sundry articles of this invention is specifically designed to fit from the rear under the rearmost bench seat 307 of a minivan such as a Chrysler Corporation Dodge Caravan or Plymouth Voyager or similar vehicle. Other receptacles 20 can be configured to fit under a crew cab 307 in a truck, such as a Chevy Silverado and GMC Sierra or other similar vehicle, such as shown in FIGS. 7A-7B. Other receptacles 20 can be configured to fit trucks with a double cab 307, such as Chevy Silverado or similar vehicle.

Figure 7G:
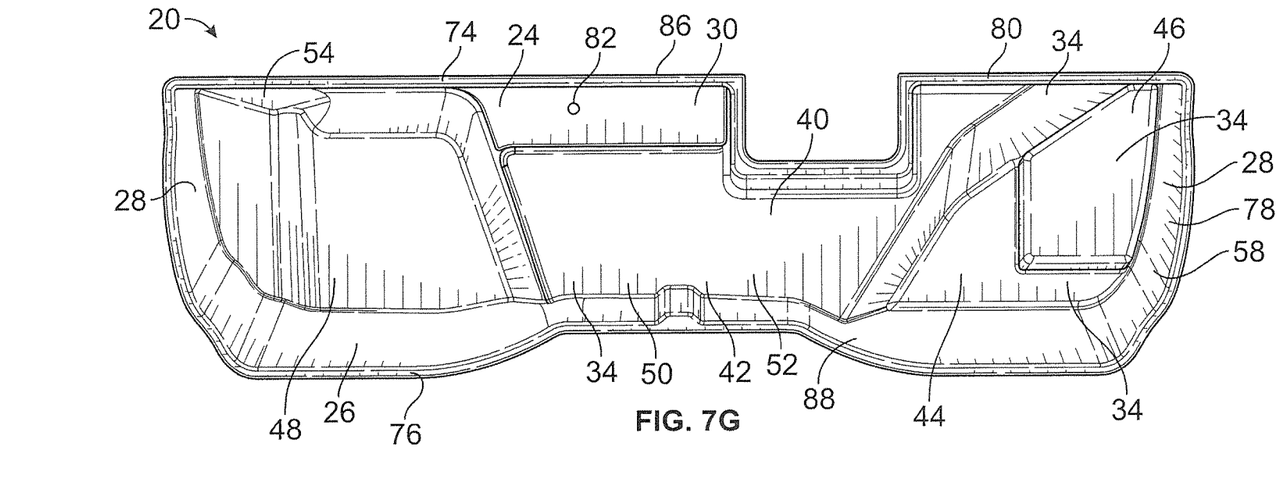
Figure 8A:
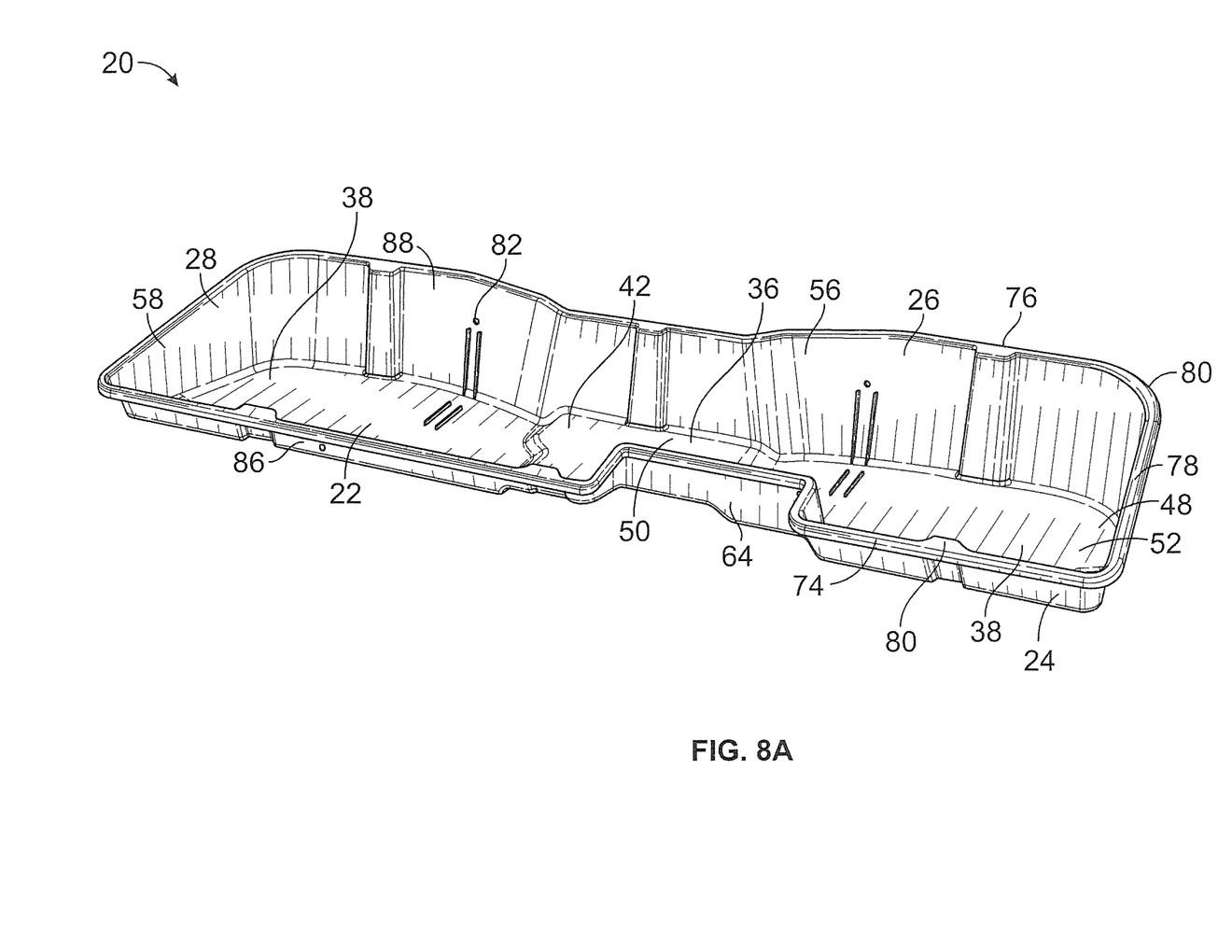
FIGS. 8A-8G show views of another embodiment of the underseat container system, with FIG. 8A showing a perspective view, FIGS. 8B-8G showing front, rear, right, left, top, and bottom views, respectively.
Figure 8B:
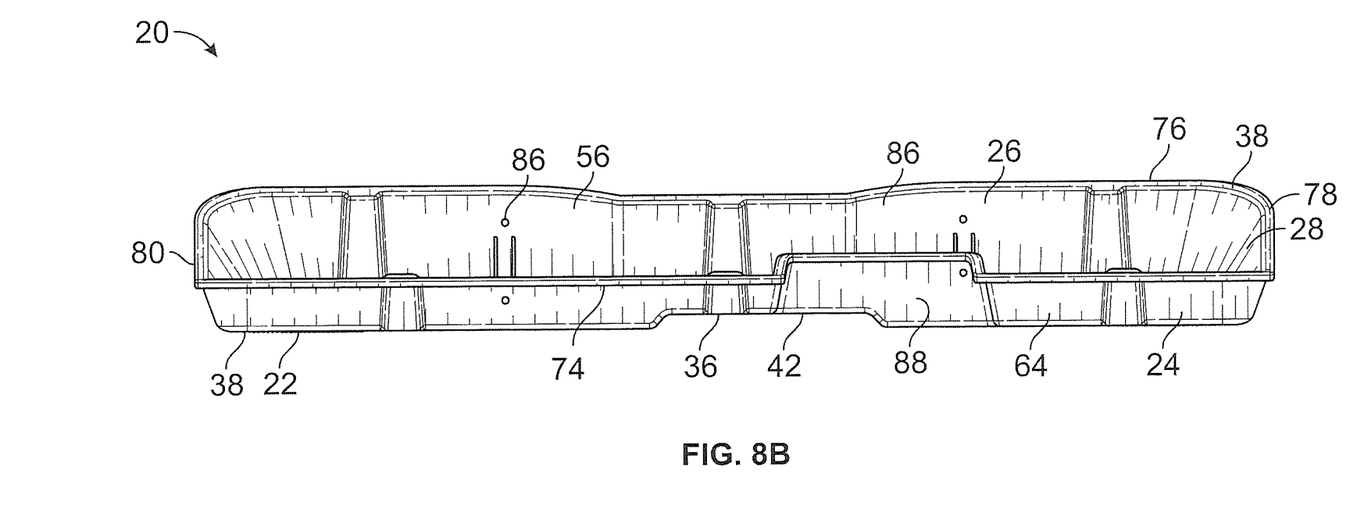
Figure 8C:
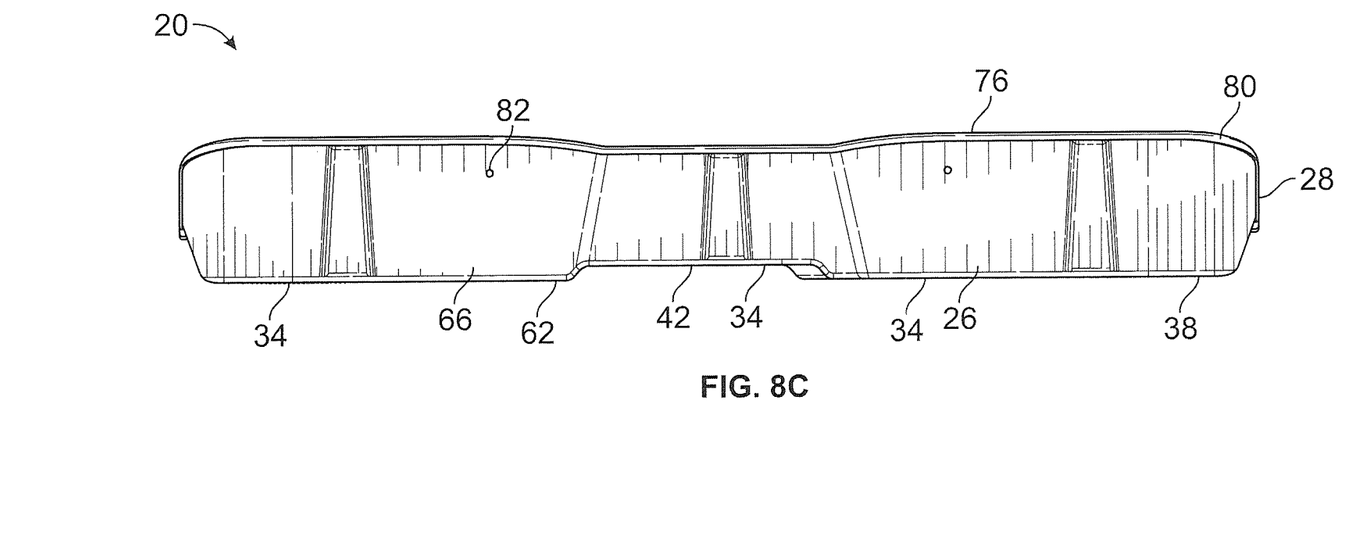
Figure 8D:
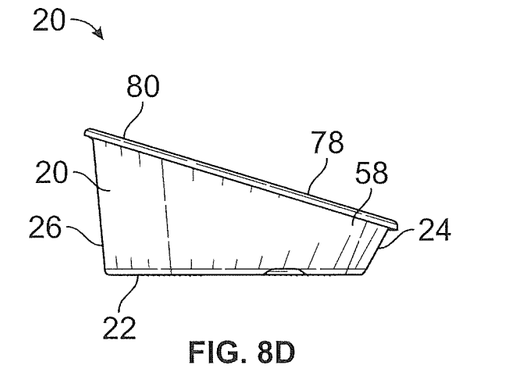
Figure 8E:
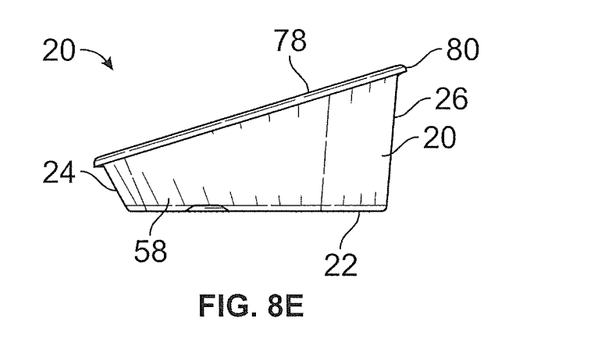
Figure 8F:
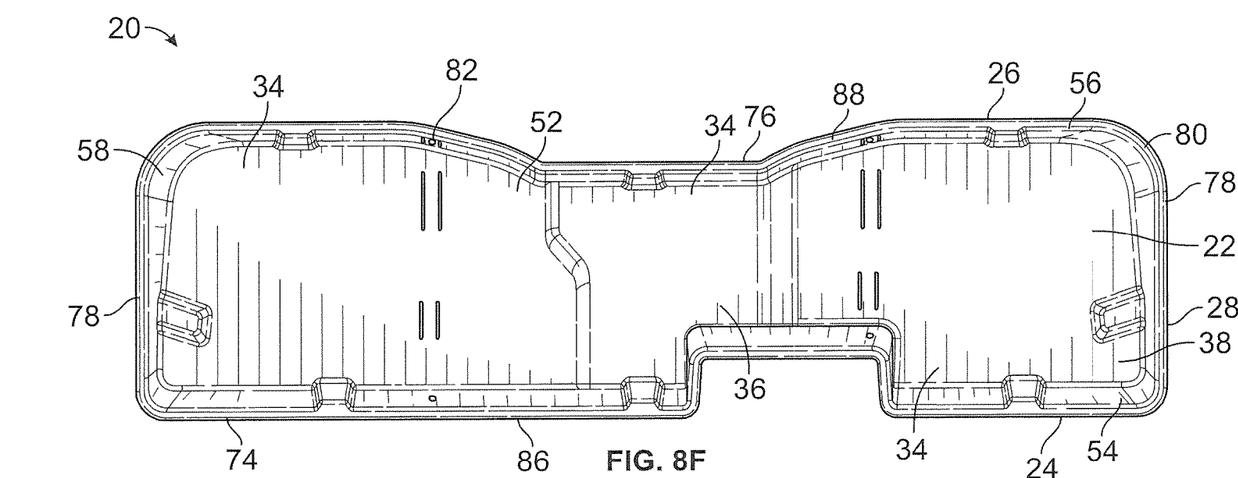
Figure 8G:
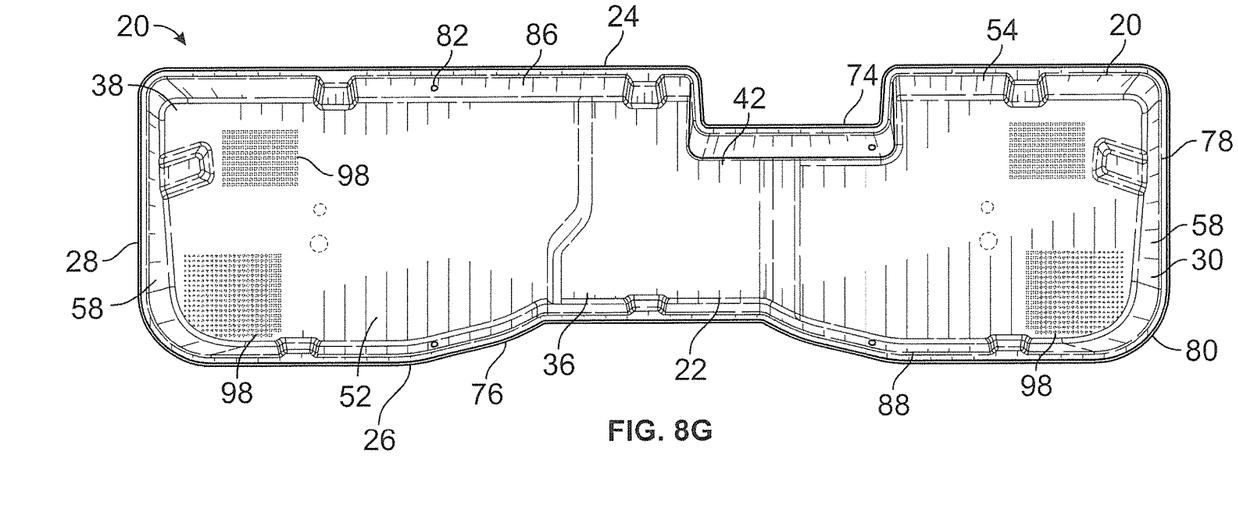

The outer surface 62 of the bottom wall 22 can have a generally smooth finish, to permit the receptacle 20 to be easily slid on the vehicle floor 315, which is often covered by carpeting, such as shown in FIGS. 7G and 8G. The bottom wall 22 can include a plurality of nubs 98 or protrusions extending from its bottom or outer surface 62; that is, the surface meant to communicate with the floor surface 315 of the vehicle. Such nubs 98 can include small lumps or protuberances on the bottom wall, which can provide traction to the underseat container system 10 and minimize sliding on the vehicle floor 315. The larger contours of the bottom wall 22 can be sufficiently smooth to allow an individual to readily slide the underseat container system 10 along the vehicle floor, while the smaller-sized nubs 98 can minimize small sliding movements by the underseat container system 10.

When it is securely fastened to a vehicle seat 307, the movement of the underseat container system 10 is restricted, but the underseat container system 10 can nonetheless move to a restricted degree. The nubs 98 can serve to further decrease the amount of movement that the secured underseat container system 10 can be caused by the movement of the vehicle. The nubs 98 can minimize the effects of forward, backward, and sideward movements by the vehicle, as well upward, downward, and irregular movements experienced by a vehicle, such as when the vehicle passes over a bump or a pothole.

Multiple nubs 98 can be arranged in rows, columns, or geometric shapes, or irregular patterns. As shown in FIG. 8G for example, multiple nubs can be concentrated in rows proximate to one or more corner sections of the bottom wall 22.

The receptacle 20 can be drawn from a single piece of material, such as by plastic injection molding, blow molding, or fabricated by welding or otherwise joining portions of one or a plurality of members to form a single unitary shell. The receptacle 20 can be made of plastic, such as polypropylene, polyethylene, polyethylene terephthalate, polyvinyl chloride, polystyrene, polylactic acid, acrylic, polycarbonate, nylon, other plastics, and mixtures thereof. Preferred embodiments can be made of high impact molded automotive grade plastic.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An underseat storage system for a vehicle, the undersea storage system comprising:
    a storage receptacle comprising: a bottom, a front and a rear, and a pair of sidewalk, the storage receptacle including first and second apertures in at least one of the front, rear, and side walls;
    first and second cables configured to passthrough the first and second apertures respectively; and
    first and second cable lock mechanisms, wherein the first cable lock mechanism is configured to secure a first segment of the first cable to any other segments of the first cable; and wherein the second cable lock mechanism is configured to secure a first segment of the second cable to any other segment of the second cable;
    wherein when the first cable is positioned through the first aperture and around a first support member of a seating system of the vehicle and the second cable is positioned through the second aperture and around a second support member of the seating system, the first cable lock mechanism and the second cable lock mechanism secure the storage receptacle in either a first configuration where the front wall extends past a front edge of the seating system or a second configuration where the front wall fails to extend past the front edge of the seating system,
    wherein, when the storage receptacle is secured in the first configuration, the first segment of the first cable is secured to a second segment of the first cable and the first segment of the second cable is secured to a second segment of the first cable,
    wherein, when the storage receptacle is secured in the second configuration, the first segment of the first cable is secured to a third segment of the first cable that is different from the second segment of the first cable and the first segment of the second cable is secured to a third segment of the second cable that is different from the second segment of the second cable.

2. The underseat storage system of claim 1, wherein each cable has a predefined length.

3. The underseat storage system of claim 1, wherein each aperture is closer to an upper edge of the rear than to the bottom.

4. The underseat storage system of claim 1, wherein the receptacle includes an open top.

5. The underseat storage system of claim 1, wherein the front, the rear, and the sidewalk are contoured to lie flush along a bottom surface of the seating system, when the seating system is configured to provide seating for an individual.

\* \* \* \* \*